United States Patent
Zhang et al.

(10) Patent No.: US 11,984,586 B1
(45) Date of Patent: May 14, 2024

(54) SURFACE-COATED POSITIVE ELECTRODE MATERIAL AND PREPARATION METHOD THEREFOR, AND LITHIUM ION BATTERY

(71) Applicant: Beijing Easpring Material Technology Co., Ltd., Beijing (CN)

(72) Inventors: Bohao Zhang, Beijing (CN); Yafei Liu, Beijing (CN); Yanbin Chen, Beijing (CN)

(73) Assignee: Beijing Easpring Material Technology Co., Ltd., Beijing (CN)

( * ) Notice: Subject to any disclaimer, the term of this patent is extended or adjusted under 35 U.S.C. 154(b) by 0 days.

(21) Appl. No.: 18/400,312

(22) Filed: Dec. 29, 2023

Related U.S. Application Data

(63) Continuation of application No. PCT/CN2023/098360, filed on Jun. 5, 2023.

(30) Foreign Application Priority Data

Jun. 30, 2022 (CN) .......................... 202210770763.9

(51) Int. Cl.
| | |
|---|---|
| *H01M 4/36* | (2006.01) |
| *H01M 4/04* | (2006.01) |
| *H01M 4/505* | (2010.01) |
| *H01M 4/525* | (2010.01) |
| *H01M 10/0525* | (2010.01) |
| *H01M 4/02* | (2006.01) |

(52) U.S. Cl.
CPC ......... *H01M 4/366* (2013.01); *H01M 4/0471* (2013.01); *H01M 4/505* (2013.01); *H01M 4/525* (2013.01); *H01M 2004/021* (2013.01); *H01M 2004/028* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2014/0038043 A1 | 2/2014 | Hirayama et al. | |
| 2017/0033354 A1 | 2/2017 | Ruan et al. | |
| 2020/0194788 A1 | 6/2020 | Mitsumoto et al. | |
| 2020/0388841 A1 | 12/2020 | Kaneda et al. | |
| 2021/0408539 A1* | 12/2021 | Zhu ....................... | H01M 4/505 |

FOREIGN PATENT DOCUMENTS

| | | |
|---|---|---|
| CN | 103493264 A | 1/2014 |
| CN | 109065875 A | 12/2018 |
| CN | 109473636 A | 3/2019 |

(Continued)

*Primary Examiner* — Carlos Barcena
(74) *Attorney, Agent, or Firm* — Sughrue Mion, PLLC

(57) ABSTRACT

Disclosed are a surface-coated positive electrode material and a preparation method therefor, and a lithium ion battery. The surface-coated cathode material contains a substrate and a coating layer coated on a surface of the substrate, and the coating layer has a bimodal distribution of characteristic peaks at 31°-35° of 2θ tested by X-Ray Diffraction (XRD); and a ratio $I_b/I_a$ of a peak intensity $I_b$ of a secondary peak to a peak intensity $I_a$ of a primary peak in a bimodal distribution is within a range of 0.8-1, preferably within a range of 0.97-1.

20 Claims, 3 Drawing Sheets

(56) References Cited

FOREIGN PATENT DOCUMENTS

| | | |
|---|---|---|
| CN | 111435742 A | 7/2020 |
| CN | 113471414 A | 10/2021 |
| CN | 115084472 A | 9/2022 |
| EP | 3 907 794 A1 | 11/2021 |

* cited by examiner

SURFACE-COATED POSITIVE ELECTRODE MATERIAL AND PREPARATION METHOD THEREFOR, AND LITHIUM ION BATTERY

CROSS-REFERENCE TO RELATED APPLICATIONS

The application is a Bypass Continuation Application of PCT/CN2023/098360 filed Jun. 5, 2023, which claims benefits of the Chinese Application No. "202210770763.9", filed on Jun. 30, 2022, entitled "SURFACE COATED CATHODE MATERIAL AND PREPARATION METHOD THEREOF, LITHIUM-ION BATTERY", the content of which is entirely incorporated herein by reference.

FIELD

The present disclosure relates to the technical field of lithium-ion batteries, particularly to a surface-coated cathode material and preparation method thereof, and a lithium-ion battery.

BACKGROUND

With the rapid development of the power battery market, people have imposed higher requirements on the energy density and safety performance of lithium-ion batteries. The practice of increasing the content of nickel and reducing the content of cobalt has gradually emerged as a tendency in recent years, in order to further increase the energy density of lithium-ion batteries and reduce the costs thereof. However, an increase in the nickel content causes a deterioration in the thermal stability of the material, and a degeneration of the safety performance during the use of the batteries. In addition, the tetravalent nickel generated during the charging and discharging process has strong oxidability, it is prone to react with the electrolyte, so the cycle performance of the batteries deteriorates, and the batteries may swell.

Therefore, for the sake of further improving the thermal stability and cycling stability of the cathode materials, a coating modification technique is widely applied in various cathode materials. CN109065875A discloses a preparation method of a high nickel multiple material coated with ultrafine powder, wherein $ZrO_2$, $TiO_2$, $Al_2O_3$, MgO, and other materials are used as the coating agents, although the coating can reduce the side reaction between the cathode and the electrolyte, and improve the battery performance, but each of the coating agents used in the method is an inert material, which does not participate in the ion and electron transport, and the thermal stability of high nickel materials is not improved.

SUMMARY

The present disclosure aims to overcome the defects in the prior art, and provides a surface-coated cathode material and preparation method thereof, and a lithium-ion battery, wherein the surface-coated cathode material comprises a substrate and a coating layer coated on a surface of the substrate; the coating layer has a bimodal distribution of characteristic peaks at 31°-35° of 2θ tested by X-Ray Diffraction (XRD); and the bimodal distribution has a specific ratio of the peak intensity of the primary peak to the peak intensity of the secondary peak, such that the surface-coated cathode material has a high electronic conductivity and ionic conductivity, and can accelerate the diffusion rate of ions and electrons in the cathode material, thereby significantly enhancing the rate performance of a lithium-ion battery including the cathode material. In addition, the surface-coated cathode material including the specific coating layer can avoid the catalytic corrosion between the cathode material and an electrolyte, and improve the cycling stability of a lithium-ion battery including the cathode material. Moreover, the thermal stability of the surface-coated cathode material including the specific coating layer is significantly improved.

In order to achieve the above object, the first aspect of the present disclosure provides a surface-coated cathode material, wherein the cathode material comprises a substrate and a coating layer coated on a surface of the substrate; the coating layer has a bimodal distribution of characteristic peaks at 31°-35° of 2θ tested by XRD, and a ratio $I_b/I_a$ of the peak intensity $I_b$ of the secondary peak to the peak intensity $I_a$ of the primary peak in the bimodal distribution is within a range of 0.8-1.

The second aspect of the present disclosure provides a method for preparing the surface-coated cathode comprising the following steps:

S1: subjecting a lithium source, a La source, an optional $N^1$ source, an optional $N^2$ source, an optional $N^3$ source, and an optional $N^4$ source to a first mixing to obtain a first mixture, performing a first sintering on the first mixture, and crushing it to obtain a coating agent;

S2: subjecting the coating agent and a cathode material substrate to a second mixing to obtain a second mixture, performing a second sintering on the second mixture to prepare the surface-coated cathode material.

The third aspect of the present disclosure provides a method for preparing the surface-coated cathode comprising the following steps:

subjecting a lithium source, a La source, an optional $N^1$ source, an optional $N^2$ source, an optional $N^3$ source, an optional $N^4$ source, and a cathode material substrate to a third mixing to obtain a third mixture, performing a third sintering on the third mixture to prepare the surface-coated cathode material.

The fourth aspect of the present disclosure provides a surface-coated cathode material produced with the aforementioned method.

The fifth aspect of the present disclosure provides a lithium-ion battery wherein the lithium-ion battery comprises the aforementioned surface-coated cathode material.

Due to the technical scheme, the surface-coated cathode material, and the preparation method and use thereof, the lithium-ion battery provided by the present disclosure produces the following beneficial effects:

The surface-coated cathode material provided by the present disclosure comprises a substrate and a coating layer coated on a surface of the substrate; the coating layer has a bimodal distribution of characteristic peaks at 31°-35° of 2θ tested by X-Ray Diffraction (XRD); and the bimodal distribution has a specific ratio of the peak intensity of the primary peak to the peak intensity of the secondary peak, such that the surface-coated cathode material has high electronic conductivity and ionic conductivity, and can accelerate the diffusion rate of ions and electrons in the cathode material, thereby significantly enhancing the rate performance of a lithium-ion battery including the cathode material. In addition, the surface-coated cathode material including the specific coating layer can avoid the catalytic corrosion between the cathode material and an electrolyte, and improve the cycling stability of a lithium-ion battery including the cathode material. Moreover, the thermal stability of the surface-coated cathode material including the specific coating layer is significantly improved.

The substrate and the coating material of the surface-coated cathode material provided by the present disclosure have a specific composition, such that the cathode material has an electrochemical activity for lithium ion deintercalation, the coating material has a high lithium ion transmission capacity; in addition, the coating material has a lower oxygen vacancy formation energy, which can increase the electronic conductivity and accelerates the diffusion rates of ions and electrons in the cathode material, thereby significantly improving rate performance of the lithium-ion battery including the cathode material. In the meantime, the coating layer having a specific composition of the present disclosure can effectively suppress the interfacial side reaction of the particle surface of the cathode material with an electrolyte, remarkably improve the cycling stability of the lithium-ion battery comprising the cathode material, and effectively improve the thermal stability of the cathode material.

The method of the cathode material provided by the present disclosure has a simple process, it is free from contamination and has a simple mode of introducing the doping elements and coating layer, requires a small dosage of the doping element and coating layer, it does not impose special requirements on the heat treatment atmosphere, and has low production costs, thus the preparation method is suitable for the large-scale industrial production.

DETAILED DESCRIPTION

Figure 1:
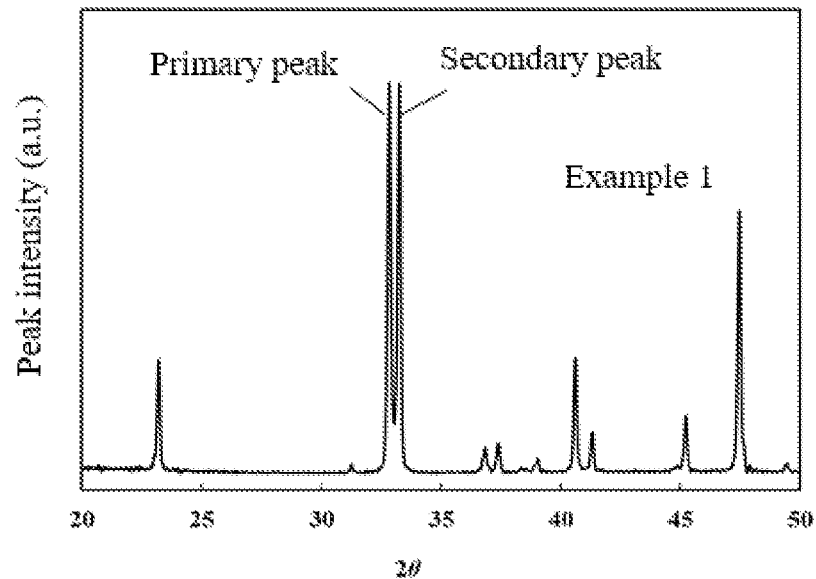
FIG. 1 illustrates an XRD phase diagram of the coating agent in Example 1.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point values of the various ranges, and the individual point values may be combined with each another to produce one or more new numerical ranges, which should be deemed have been specifically disclosed herein.

The first aspect of the present disclosure provides a surface-coated cathode material, wherein the cathode material comprises a substrate and a coating layer coated on a surface of the substrate;

the coating layer has a bimodal distribution of characteristic peaks at 31°-35° of 2θ tested by XRD, and a ratio $I_b/I_a$ of the peak intensity $I_b$ of the secondary peak to the peak intensity $I_a$ of the primary peak in the bimodal distribution is within a range of 0.8-1.

In the present disclosure, the surface-coated cathode material comprises a substrate and a coating layer coated on a surface of the substrate, the coating layer has a bimodal distribution of characteristic peaks at 31°-35° of 2θ tested by XRD, and the bimodal distribution has a specific ratio of the peak intensity of the primary peak to the peak intensity of the secondary peak, such that the surface-coated cathode material has a high electronic conductivity and ionic conductivity, and can accelerate the diffusion rate of ions and electrons in the cathode material, thereby significantly enhancing the rate performance of a lithium-ion battery including the cathode material.

In addition, the surface-coated cathode material including the specific coating layer can avoid the catalytic corrosion between the cathode material and an electrolyte, and improve the cycling stability of a lithium-ion battery including the cathode material. Moreover, the thermal stability of the surface-coated cathode material including the specific coating layer is significantly improved.

In the present disclosure, the peak intensity $I_b$ of the secondary peak and the peak intensity $I_a$ of the primary peak in the bimodal distribution are measured by XRD, respectively.

Preferably, the ratio $I_b/I_a$ is within a range of 0.97-1.

According to the present disclosure, the substrate has a peak intensity $I_{(003)}$ of the characteristic peak (003) corresponding to the (003) crystal plane tested by XRD, $0.01\% \leq I_a/I_{(003)} \times 100\% \leq 3.5\%$.

In the present disclosure, when the ratio of the peak intensity $I_a$ of the primary peak in the bimodal distribution of characteristic peaks at 31°-35° of 2θ of the coating layer to the peak intensity $I_{(003)}$ of the characteristic peak (003) corresponding to the (003) crystal plane of the substrate is within the above range, the thermal stability of the cathode material can be improved, increasing the temperature corresponding to the exothermic peak of the cathode material tested by the DSC, such that the lithium-ion battery containing the cathode material has an improved safety performance.

In the present disclosure, the peak intensity $I_{(003)}$ of the characteristic peak (003) corresponding to the (003) crystal plane of the substrate is tested by XRD.

Preferably, $0.08\% \leq I_a/I_{(003)} \times 100\% \leq 3.1\%$.

According to the present disclosure, the substrate has a peak area $A_{(003)}$ of the characteristic peak (003) corresponding to the (003) crystal plane tested by XRD, the coating layer has a peak area $A_a$ of the primary peak in the bimodal distribution of characteristic peaks at 31°-35° of 2θ tested by XRD, $0.01\% \leq A_a/A_{(003)} \times 100\% \leq 6\%$.

In the present disclosure, when the ratio of the peak area $A_a$ of the primary peak in the bimodal distribution of characteristic peaks at 31°-35° of 2θ of the coating layer and the peak area $A_{(003)}$ of the characteristic peak (003) corresponding to the (003) crystal plane of the substrate is within the above range, the thermal stability of the cathode material can be improved, increasing the temperature corresponding to the exothermic peak of the cathode material tested by the DSC, such that the lithium-ion battery containing the cathode material has an improved safety performance.

In the present disclosure, both the peak area $A_a$ of the primary peak in the bimodal distribution of characteristic peaks at 31°-35° of 2θ of the coating layer and the peak area $A_{(003)}$ of the characteristic peak (003) corresponding to the (003) crystal plane of the substrate are measured by XRD.

Preferably, $0.5\% \leq A_a/A_{(003)} \times 100\% \leq 4.8\%$.

According to the present disclosure, the substrate has a composition represented by formula I:

$$Li_{1+a}Ni_xCo_yMn_zM_kO_2 \qquad \text{formula I;}$$

wherein −0.05≤a≤0.5, 0≤x≤1, 0≤y≤1, 0≤z≤1, 0≤k≤0.06, 0≤x+y+z+k≤1, and M is at least one element selected from Ga, Sc, In, Y, Ce, Co, La, Cr, Mo, Mn, Fe, Hf, Zr, W, Nb, Sm, and Al;

the coating layer has a composition represented by formula II:

$Li_{\alpha-\beta-\gamma-\delta}La_{\beta}N^1_{\gamma}N^2_{\delta}N^3_{1-\gamma}N^4_{\lambda}O_3$          formula II;

wherein 0.7<α<1.5, 0.2<β<1, 0≤γ<0.5, 0≤δ<0.5, 0≤γ<0.5; $N^1$ is at least one element selected from Y, Nd, Pr, Ce, Sm, and Sc, $N^2$ is at least one element selected from Sr, Ca, Mg, Si, Ge, and Ru, $N^3$ is at least one element selected from Ni, Mn, and Co, $N^4$ is at least one element selected from Cr, Al, V, Nb, Zr, Ti, and Fe.

In the present disclosure, the substrate and the coating material of the surface-coated cathode material have a specific composition, such that the cathode material has an electrochemical activity for lithium ion deintercalation, the coating material has a high lithium ion transport ability; in addition, the coating material has a lower oxygen vacancy formation energy, which can increase the electronic conductivity and accelerate the diffusion rates of ions and electrons in the cathode material, thereby significantly improving rate performance of the lithium-ion battery including the cathode material. In the meantime, the coating layer having a specific composition of the present disclosure can effectively suppress the interfacial side reaction of the particle surface of the cathode material with an electrolyte, remarkably improve the cycling stability of the lithium-ion battery comprising the cathode material, and effectively improve the thermal stability of the cathode material.

Further, M in formula I is at least one element selected from Ce, Co, La, Cr, Mo, Y, Zr, W, Nb, and Al.

Further, in formula II, 0.9<α<1.3, 0.35<β<0.7, 0.04≤γ<0.4, 0<δ<0.3, 0≤λ<0.46.

Further, $N^1$ in formula II is at least one element selected from Nd, Pr, Ce, Sm, and Sc.

Further, $N^2$ in formula II is at least one element selected from Sr, Ca, Mg, Si, and Ru.

Further, $N^3$ in formula II is selected from Ni and/or Mn.

Further, $N^4$ in formula II is at least one element selected from Cr, Al, Nb, Zr, Ti, and Fe.

According to the present disclosure, the content of the coating layer is within a range of 0.05-4 wt %, based on the total weight of the substrate.

In the present disclosure, when the content of said coating layer satisfies the above-mentioned range, the cathode material surface has a uniform coating layer, which enables the cathode material surface to exhibit high ion and electron transport properties, such that the lithium-ion battery containing the cathode material has excellent electrochemical properties.

Preferably, the content of the coating layer is within a range of 0.5-3.6 wt %, based on the total weight of the substrate.

According to the present disclosure, an average particle diameter $D_{50}$ of the surface-coated cathode material is within a range of 2-17 μm.

Preferably, an average particle diameter $D_{50}$ of the surface-coated cathode material is within a range of 3-12 μm.

According to the present disclosure, the electronic conductivity of the coating layer is within a range of $1 \times 10^{-5}$ S/cm-$8 \times 10^{-3}$ S/cm.

In the present disclosure, when the electronic conductivity of the coating layer is within the above range, the coating layer has high electron-transport property and can form an electronic conductive layer on the surface of the cathode material, thereby causing that the lithium-ion battery containing the cathode material has excellent electrochemical properties.

Preferably, the electronic conductivity of the coating layer is within a range of $1.8 \times 10^{-5}$ S/cm-$7.2 \times 10^{-3}$ S/cm.

According to the present disclosure, the ionic conductivity of the coating layer is within a range of $1 \times 10^{-6}$ S/cm-$6 \times 10^{-4}$ S/cm.

In the present disclosure, when the ionic conductivity of the coating layer is within the above range, it has high ion transport property and can form an ionic conductive layer on the surface of the cathode material, thereby causing that the lithium-ion battery containing the cathode material has an excellent electrochemical properties.

Further, the ionic conductivity of the coating layer is within a range of $3 \times 10^{-6}$ S/cm-$5 \times 10^{-4}$ S/cm.

According to the present disclosure, the oxygen vacancy formation energy of the coating layer is from −2 eV to 4.5 eV.

In the present disclosure, when the oxygen vacancy formation energy of the coating layer is within the above range, the coating layer has high electron-transport property and can form an electronic conductive layer on the surface of the cathode material, thereby causing that the lithium-ion battery containing the cathode material has an excellent electrochemical properties.

Further, the oxygen vacancy formation energy of the coating layer is from −1.8 eV to 4 eV.

According to the present disclosure, the temperature corresponding to an exothermic peak of surface-coated cathode material tested by the Differential Scanning calorimeter (DSC) is T1, the temperature corresponding to an exothermic peak of the substrate tested by DSC is T0, T1-T0 is within a range of 3-15° C.

In the present disclosure, when the difference between the temperatures corresponding to the exothermic peak of the surface-coated cathode material tested by DSC and the temperature corresponding to the exothermic peak of the substrate tested by DSC is within the above range, the thermal stability of the cathode material can be significantly improved, thereby causing that the lithium-ion battery comprising the cathode material has a high safety performance.

Preferably, T1-T0 is within a range of 3-14° C.

The second aspect of the present disclosure provides a method for preparing the surface-coated cathode comprising the following steps:

S1: subjecting a lithium source, a La source, an optional $N^1$ source, an optional $N^2$ source, an $N^3$ source, and an optional $N^4$ source to a first mixing to obtain a first mixture, performing a first sintering on the first mixture, and crushing it to obtain a coating agent;

S2: subjecting the coating agent and a cathode material substrate to a second mixing to obtain a second mixture, performing a second sintering on the second mixture to prepare the surface-coated cathode material.

According to the present disclosure, a coating agent is obtained by sintering the first mixture comprising a lithium source, a La source, an optional $N^1$ source, an optional $N^2$ source, a $N^3$ source and an optional $N^4$ source, then blending the coating agent with a cathode substrate, and subjecting to a heat treatment, the surface-coated cathode material comprising a substrate and a coating layer coated on a surface of the substrate can be prepared, and the coating layer has the characteristics according to the first aspect of the present disclosure, in particular, in the surface-coated cathode material produced with the method provided by the present disclosure, the coating layer has a bimodal distribution of characteristic peaks at 31°-35° of 2θ tested by XRD; and the bimodal distribution has a specific ratio of the peak intensity of the primary peak to the peak intensity of the secondary peak, such that the surface-coated cathode material has a high electronic conductivity and ionic conductivity, and can accelerate the diffusion rate of ions and electrons in the cathode material, thereby significantly enhancing the rate performance of a lithium-ion battery including the cathode material.

Further, the surface-coated cathode material including the specific coating layer can avoid the catalytic corrosion between the cathode material and an electrolyte, and improve the cycling stability of a lithium-ion battery including the cathode material. Moreover, the thermal stability of the surface-coated cathode material including the specific coating layer is significantly improved.

Furthermore, the method has a simple process, is free from contamination, and has a simple mode of introducing the doping elements and coating layer, requires a small dosage of the doping element and coating layer, and does not impose special requirements on the heat treatment atmosphere and has low production costs, thus the method is suitable for the large-scale industrial production.

According to the present disclosure, the lithium source, the La source, the $N^1$ source, the $N^2$ source, the $N^3$ source, and the $N^4$ source are used in amounts such that n(Li):n(La):n($N^1$):n($N^2$):n($N^3$):n($N^4$) is (α-β-γ-δ):β:γ:δ:(1−λ):λ, wherein 0.7<α<1.5, 0.2<β<1, 0≤γ<0.5, 0≤δ<0.5, 0≤λ<0.5.

Preferably, 0.9<α<1.3, 0.35<β<0.7, 0.04≤γ<0.4, 0<δ<0.3, 0≤λ<0.46.

According to the present disclosure, the content of the coating agent is within a range of 0.05-4 wt %, preferably within a range of 0.1-3.6 wt %, based on the total weight of the substrate.

According to the present disclosure, the $N^1$ source is a compound containing at least one element selected from Y, Nd, Pr, Ce, Sm, and Sc.

According to the present disclosure, the $N^2$ source is a compound containing at least one element selected from Sr, Ca, Mg, Si, Ge, and Ru.

According to the present disclosure, the $N^3$ source is a compound containing at least one element selected from Ni, Mn, and Co.

According to the present disclosure, the $N^4$ source is a compound containing at least one element selected from Cr, Al, V, Nb, Zr, Ti, and Fe.

The specific kind of the lithium source is not particularly limited in the present disclosure, it may be a lithium source commonly used in the art, for example, the lithium source is at least one selected from the group consisting of lithium carbonate, lithium hydroxide, lithium fluoride, lithium chloride, lithium nitrate, and lithium acetate.

The specific kind of La source is not specifically limited in the present disclosure, it may be a conventional compound capable of providing La element in the art.

In the present disclosure, the conditions for the first mixing are not particularly limited, as long as the lithium source, the La source, the $N^1$ source, the $N^2$ source, the $N^3$ source, and the $N^4$ source can be blended sufficiently and uniformly, and preferably, the conditions for the first mixing comprise a mixing rotational speed of 400-1,000 rpm and a mixing time of 3-6 h.

According to the present disclosure, the conditions of the first sintering comprise a sintering temperature within a range of 500-1,120° C. and a sintering time within a range of 3-9 h.

In the present disclosure, the coating agent having a high ionic conductivity and electronic conductivity can be prepared by sintering a first mixture comprising a lithium source, a La source, an optional $N^1$ source, an optional $N^2$ source, an $N^3$ source, an optional $N^4$ source under the above conditions.

Preferably, the conditions of the first sintering comprise a sintering temperature within a range of 600-1,000° C. and a sintering time within a range of 3-9 h According to the present disclosure, the average particle diameter $D_{50}$ of the coating agent is within a range of 30-200 nm.

In the present disclosure, the apparatus used for crushing is not particularly limited, for example, the sintered product is crushed by at least one selected from the group consisting of a flow mill, a mechanical mill, a colloid mill, a high-energy pulverizer, a stirring mill, and a sand mill to obtain the coating agent.

Further preferably, the average particle diameter $D_{50}$ of the coating agent is within a range of 50-180 nm.

In the present disclosure, the conditions for the second mixing are not particularly limited, as long as the coating agent and the cathode material substrate can be blended sufficiently and uniformly, and preferably, the conditions of the second mixing comprise a mixing rotational speed of 400-1,000 rpm and a mixing time of 3-6 h.

In the present disclosure, the device used for the first mixing and the second mixing is not particularly limited, it may be the conventional mixing equipment in the art, such as a high-speed blender.

According to the present disclosure, the conditions of the second sintering comprise a sintering temperature within a range of 300-900° C. and a sintering time within a range of 1-12 h.

In the present disclosure, carrying out the second sintering on the second mixture under the above-mentioned conditions, such that the surface of the cathode material has the ion and electron transport properties, such that the lithium-ion battery comprising the cathode material has excellent electrochemical performance.

Preferably, the conditions of the second sintering comprise a sintering temperature within a range of 400-800° C. and a sintering time within a range of 4-10 h In a specific embodiment of the present disclosure, the coating agent is prepared according to the following steps:

(a) subjecting a lithium source, a La source, an optional $N^1$ source, an optional $N^2$ source, a $N^3$ source, and an optional $N^4$ source to a fourth mixing to obtain a fourth mixture, performing a fourth sintering on the fourth mixture, and crushing it to obtain a coating agent.

In the present disclosure, the conditions of the fourth mixing are not particularly limited as long as the lithium source, the La source, the $N^1$ source, the $N^2$ source, the $N^3$ source, and the $N^4$ source can be blended sufficiently and uniformly, and preferably, the conditions of the fourth mixing comprise a mixing rotational speed of 400-1,000 rpm and a mixing time of 3-6 h. In the present disclosure, the conditions of the fourth mixing and the conditions of the first mixing may be the same or different.

According to the present disclosure, the conditions of the fourth sintering comprise a sintering temperature within a range of 600-1,000° C. and a sintering time within a range of 3-9 h.

Preferably, the conditions of the fourth sintering comprise a sintering temperature within a range of 700-1,000° C. and a sintering time within a range of 5-9 h.

In another specific embodiment of the present disclosure, the coating agent is prepared according to the following steps:

(b) subjecting a lithium source, a La source, an optional $N^1$ source, an optional $N^2$ source, a $N^3$ source, an optional $N^4$ source, and a solvent to a fifth mixing to obtain a fifth mixture, adjusting the pH of the fifth mixture, drying and performing a fifth sintering, and crushing it to obtain a coating agent.

In the present disclosure, the conditions for the fifth mixing are not particularly limited as long as the lithium source, the La source, the $N^1$ source, the $N^2$ source, the $N^3$ source, the $N^4$ source, and the solvent are blended sufficiently and uniformly, and preferably, the conditions for the fifth mixing comprising a mixing rotational speed of 400-1,000 rpm and a mixing time of 3-6 h.

In the present disclosure, the kind of solvent is not particularly limited as long as the lithium source, the La source, the $N^1$ source, the $N^2$ source, the $N^3$ source, and the $N^4$ source can be prepared into a solution, for instance, the solvent is ethanol.

In the present disclosure, the pH of the fifth mixture may be adjusted by using a conventional acidic solution in the art, such as citric acid; preferably, an acidic solution is added so that the pH of the fifth mixture is between 9 and 12.

In the present disclosure, the conditions for drying are not particularly limited as long as the fifth mixture is sufficiently dried, and preferably, the drying conditions include a drying temperature within a range of 40-120° C. and a drying time of 5-12 h.

According to the present disclosure, the conditions of the fifth sintering comprise a sintering temperature within a range of 500-850° C. and a sintering time within a range of 4-8 h.

Preferably, the conditions of the fifth sintering comprise a sintering temperature within a range of 550-800° C. and a sintering time within a range of 5-8 h.

A third aspect of the present disclosure provides a method for preparing the surface-coated cathode comprising the following steps:

subjecting a lithium source, a La source, an optional $N^1$ source, an optional $N^2$ source, an $N^3$ source, an optional $N^4$ source, and a cathode material substrate to a third mixing to obtain a third mixture, performing a third sintering on the third mixture to prepare the surface-coated cathode material.

In the method for preparing the surface-coated cathode material according to the third aspect of the present disclosure, other material types and amounts, conditions of each step, and parameters involved therein are identical to those in the method of the previously mentioned second aspect, and in order to avoid repetition, the present disclosure does not repeat some characteristics of the materials (e.g. alternative types of the materials) in the second aspect.

According to the present disclosure, the lithium source, the La source, the $N^1$ source, the $N^2$ source, the $N^3$ source, and the $N^4$ source are used in amounts such that n(Li):n(La):n($N^1$):n($N^2$):n($N^3$):n($N^4$) is ($\alpha$-$\beta$-$\gamma$-$\delta$):$\beta$:$\gamma$:$\delta$:(1–$\lambda$):$\lambda$, wherein $0.7<\alpha<1.5$, $0.2<\beta<1$, $0\leq\gamma<0.5$, $0\leq\delta<0.5$, $0\leq\lambda<0.5$.

According to the present disclosure, the total amount of the lithium source, the La source, the $N^1$ source, the $N^2$ source, the $N^3$ source, and the $N^4$ source causes the content of a product of the lithium source, the La source, the $N^1$ source, the $N^2$ source, the $N^3$ source, and the $N^4$ source obtained after the third sintering is within a range of 0.05-4 wt %, preferably within a range of 0.1-3.6 wt %, based on the total weight of the cathode material substrate.

According to the present disclosure, the conditions of the third sintering comprise a sintering temperature within a range of 300-900° C. and a sintering time within a range of 1-12 h.

In the present disclosure, carrying out the third sintering on the third mixture under the above-mentioned conditions, such that the surface of the cathode material has the ion and electron transport properties, such that the lithium-ion battery comprising the cathode material has excellent electrochemical performance.

Preferably, the conditions of the third sintering comprise a sintering temperature within a range of 400-800° C. and a sintering time within a range of 4-10 h.

In the present disclosure, the average particle diameter $D_{50}$ of the cathode material substrate is within a range of 2.3-12 μm. In the present disclosure, the cathode material substrate used in the second aspect and the third aspect is not particularly limited, it may be prepared by using a conventional preparation method in the art, and in order to further improve the electrochemical activity of lithium-ion deintercalation of a surface-coated cathode material, such that the lithium-ion battery including the surface-coated cathode material has excellent rate performance, it is preferable that the cathode material substrate is prepared according to the following steps:

(1) preparing a mixed salt solution with a nickel salt, a cobalt salt, and a manganese salt according to the molar ratio of n(Ni):n(Co):n(Mn) being x:y:z; preparing a precipitant solution and a complexing agent solution with a precipitant and a complexing agent respectively;

(2) adding the mixed salt solution, the precipitant solution, and the complexing agent solution into a reaction kettle, and performing a coprecipitation reaction to obtain a precursor slurry, wherein the precursor slurry is subjected to solid-liquid separation, washing, drying, and sieving to obtain a nickel-cobalt-manganese hydroxide precursor;

(3) blending the nickel-cobalt-manganese hydroxide precursor, a lithium source, and an optional compound containing an M element to obtain a sixth mixture, carrying out a sixth sintering on the sixth mixture in an oxygen-containing atmosphere, and crushing and sieving to obtain the cathode material substrate.

According to the present disclosure, $0\leq x\leq 1$, $0\leq y\leq 1$, $0\leq z\leq 1$.

In the present disclosure, at least one of the nickel salt, the cobalt salt, the manganese salt, and the compound containing an M element is added in the method of the cathode material substrate.

In the present disclosure, the kind of nickel salt is not particularly limited, it may be a nickel salt that is conventional in the art, for example, at least one of nickel sulfate, nickel chloride, nickel nitrate, and nickel acetate.

In the present disclosure, the kind of cobalt salt is not particularly limited, it may be a cobalt salt that is commonly used in the art, for example, at least one of cobalt sulfate, cobalt chloride, cobalt nitrate, and cobalt acetate.

In the present disclosure, the kind of the manganese salt is not particularly limited, it may be a manganese salt that is commonly used in the art, such as at least one of manganese sulfate, manganese chloride, manganese nitrate, and manganese acetate.

In the present disclosure, the kind of the precipitant is not particularly limited, it may be a conventional precipitant in the art, for example, at least one selected from the group consisting of ammonium carbonate, ammonium bicarbonate, sodium carbonate, sodium bicarbonate, potassium carbonate, potassium bicarbonate, sodium hydroxide, potassium hydroxide, and lithium hydroxide.

In the present disclosure, the kinds of the complexing agent are not particularly limited, both may be a complexing agent commonly used in the art, for example, at least one selected from the group consisting of ammonia water, disodium ethylenediaminetetraacetate, ammonium nitrate, ammonium chloride, and ammonium sulfate.

According to the present disclosure, the nickel-cobalt-manganese hydroxide precursor, the lithium source, and the compound containing an M element are used in amounts such that $n(Li)/[n(Ni)+n(Co)+n(Mn)+n(M)]$ is within a range of 0.95-1.5; $n(M)/[n(Ni)+n(Co)+n(Mn)+n(M)]$ is within a range of 0-0.06.

Preferably, the nickel-cobalt-manganese hydroxide precursor, the lithium source, and the compound containing an M element are used in amounts such that $n(Li)/[n(Ni)+n(Co)+n(Mn)+n(M)]$ is within a range of 0.96-1.03; $n(M)/[n(Ni)+n(Co)+n(Mn)+n(M)]$ is within a range of 0-0.05.

According to the present disclosure, the compound containing an M element is selected from compounds containing at least one element of Ga, Sc, In, Y, Ce, Co, La, Cr, Mo, Mn, Fe, Hf, Zr, W, Nb, Sm, and Al.

In the present disclosure, the kind of the lithium source is not particularly limited, it may be a conventional lithium source in the art, for example, at least one selected from the group consisting of lithium carbonate, lithium hydroxide, lithium fluoride, lithium chloride, lithium nitrate, and lithium acetate.

According to the present disclosure, the conditions of the coprecipitation reaction comprise a reaction temperature within a range of 40-120° C. and a pH within a range of 9-12.

In the present disclosure, the conditions for the sixth mixing are not particularly limited as long as the nickel-cobalt-manganese hydroxide precursor, the lithium source, and the compound containing an M element can be blended sufficiently and uniformly, and preferably, the conditions for the sixth mixing comprise a mixing rotational speed within a range of 400-1,000 rpm and a mixing time of 3-6 h.

According to the present disclosure, the conditions of the sixth sintering comprise a sintering temperature within a range of 500-1,000° C. and a sintering time within a range of 3-18 h.

In the present disclosure, when the sixth mixture is subjected to the sixth sintering under the above-mentioned conditions, the obtained cathode material is free from a heterogeneous phase.

Preferably, the conditions of the sixth sintering comprise a sintering temperature within a range of 600-1,000° C. and a sintering time within a range of 5-9 h.

The fourth aspect of the present disclosure provides a surface-coated cathode material produced with the aforementioned method.

The fifth aspect of the present disclosure provides a lithium-ion battery, wherein the lithium-ion battery comprises the aforementioned surface-coated cathode material.

In the present disclosure, the lithium-ion battery further comprises a negative electrode and an electrolyte. The types of the negative electrode and the electrolyte are not particularly limited, the conventional type of the negative electrode and the electrolyte in the art may be used, for example, the electrolyte is the commonly used and commercially available electrolyte, which is a mixed solution having a concentration of 1 mol/L containing the equivalent amount of $LiPF_6$, Ethylene Carbonate (EC), and diethyl carbonate (DEC).

The present disclosure will be described in detail below with reference to examples. In the following examples, the average particle diameter $D_{50}$ of the surface-coated cathode material was measured by using a Malvern particle meter.

The composition of the surface-coated reactive electrode material was calculated from the molar ratio of the reactants.

The phase structure of the coating agent and the coated cathode material was measured by XRD.

The electronic conductivity of the coating agent was measured through a four-probe method.

The ionic conductivity of the coating agent was obtained by sintering the ceramic chip and carrying out the blocking electrode alternating current impedance test, and then calculated according to the formula $\sigma=L/RS$, wherein L denoted the thickness of a ceramic chip, R denoted an impedance value, and S denoted the effective electrode area.

The oxygen vacancy formation energy of the coating agent can be calculated according to the First Principle of Thinking.

Assembling the Liquid Button Cell:

Firstly, a surface-coated cathode material, acetylene black, and polyvinylidene fluoride (PVDF) were mixed according to the mass ratio of 95:2.5:2.5, the mixture was coated on an aluminum foil and subjected to the drying treatment, the aluminum foil was punched into a cathode pole piece having a diameter of 12 mm and a thickness of 120 μm by using the pressure of 100 MPa, the cathode pole piece was then subjected to drying in a vacuum drying box at the temperature of 120° C. for 12 h.

The Li metal sheet with a diameter of 17 mm and a thickness of 1 mm was used as a negative electrode; the polyethylene porous film having a thickness of 25 μm was used as the separator; the mixed solution having a concentration of 1 mol/L containing the equivalent amount of $LiPF_6$, Ethylene Carbonate (EC), and diethyl carbonate (DEC) was used as the electrolyte.

The cathode pole piece, the separators, the negative electrode pole piece, and the electrolyte were assembled into the 2025 type button cell in an Ar gas glove box with both the water content and the oxygen content less than 5 ppm.

The thermal stability of surface-coated cathode materials was measured by the DSC testing on the cathode pole piece in the delithiation state (i.e., at the end of the battery charging process).

The properties of the button cell were evaluated as follows:

(1) The testing of charging and discharging performance: the charging and discharging performance of the material was measured at the temperature of 25° C. and under the multiplying power of 0.1C within the voltage range of 3.0-4.3V.

(2) The testing of cycle performance: the capacity retention rate of the material was measured after 80 charging and discharging cycles at the temperature of 25° C. and under the multiplying power of 1C within the voltage range of 3.0-4.3V.

Preparation Example 1

Cathode Material Substrate (1) A mixed salt solution having a concentration of 2 mol/L and consisting of nickel sulfate, cobalt sulfate, and manganese sulfate was prepared according to the molar ratio of Ni, Co, and Mn being 93:2:5. A sodium hydroxide alkali solution having a concentration of 7 mol/L was prepared, and an ammonia-water complexing agent solution with a concentration of 4 mol/L was prepared.

(2) The mixed salt solution, the sodium hydroxide alkali solution, and the ammonia-water complexing agent solution were continuously added into a stirrer in a co-current flow manner for carrying out a reaction, wherein the stirring rotational speed was 120 rpm. In addition, the feed liquor flow rate of the mixed salt solution was controlled to be 40 L/h, the feed liquor flow rate of the sodium hydroxide alkali solution was controlled to be 20 L/h, the feed liquor flow rate of the complexing agent solution was controlled to be 7 L/h, the pH value was 11.5 and the temperature was 60° C. When the reaction was finished, the obtained nickel-cobalt-manganese hydroxide slurry was subjected to solid-liquid separation and washing, the filter cake was subjected to drying at 100° C. for 10 hours, the dried filter cake was sieved, the product was subjected to washing, filtering and drying to obtain a precursor.

(3) The precursor, lithium hydroxide, and aluminum oxide were uniformly mixed according to the proportion of Li/(Ni+Co+Mn+Al)=1.02 and Al/(Ni+Co+Mn+Al)=0.01, the mixture was sintered at 900° C. for 10 hours, and the product was crushed and sieved to obtain a cathode material substrate P1, which had an average particle diameter $D_{50}$ of 3.4 μm.

The composition and particle size of the cathode material substrate were measured, and the results were shown in Table 1.

Preparation Example 2

(1) A mixed salt solution having a concentration of 2 mol/L and consisting of nickel sulfate, cobalt sulfate, and manganese sulfate was prepared according to the molar ratio of Ni, Co, and Mn being 90:3:7. A sodium hydroxide alkali solution having a concentration of 7 mol/L was prepared, and an ammonia-water complexing agent solution with a concentration of 6 mol/L was prepared.

(2) The mixed salt solution, the sodium hydroxide alkali solution, and the ammonia water complexing agent solution were continuously added into a stirrer in a co-current flow manner for carrying out a reaction, wherein the stirring rotational speed was 100 rpm. In addition, the feed liquor flow rate of the mixed salt solution was controlled to be 35 L/h, the feed liquor flow rate of the sodium hydroxide alkali solution was controlled to be 17 L/h, the feed liquor flow rate of the complexing agent solution was controlled to be 9 L/h, the pH value was controlled to be 11.6, and the temperature was 60° C. When the reaction was finished, the obtained nickel-cobalt-manganese hydroxide slurry was subjected to solid-liquid separation and washing, the filter cake was subjected to drying at 100° C. for 10 hours, the dried filter cake was sieved, the product was subjected to washing, filtering and drying to obtain a precursor.

(3) The precursor, lithium carbonate, and zirconium oxide were uniformly mixed according to the proportion of Li/(Ni+Co+Mn+Zr)=1.03 and Zr/(Ni+Co+Mn+Zr)=0.02, the mixture was sintered at 750° C. for 10 hours, and the product was crushed and sieved to obtain a cathode material substrate P2, which had an average particle diameter $D_{50}$ of 3.7 μm. The composition and particle size of the cathode material substrate were measured, and the results were shown in Table 1.

Preparation Example 3

(1) A mixed salt solution having a concentration of 2 mol/L and consisting of nickel sulfate, cobalt sulfate, and manganese sulfate was prepared according to the molar ratio of Ni, Co, and Mn being 90:5:5. A sodium hydroxide alkali solution having a concentration of 7 mol/L was prepared, and an ammonia-water complexing agent solution with a concentration of 5 mol/L was prepared.

(2) The mixed salt solution, the sodium hydroxide alkali solution, and the ammonia water complexing agent solution were continuously added into a stirrer in a co-current flow manner for carrying out a reaction, wherein the stirring rotational speed was 100 rpm. In addition, the feed liquor flow rate of the mixed salt solution was controlled to be 40 L/h, the feed liquor flow rate of the sodium hydroxide alkali solution was controlled to be 19 L/h, the feed liquor flow rate of the complexing agent solution was controlled to be 9 L/h, the pH value was controlled to be 11.6, and the temperature was 60° C. When the reaction was finished, the obtained nickel-cobalt-manganese hydroxide slurry was subjected to solid-liquid separation and washing, the filter cake was subjected to drying at 100° C. for 10 hours, the dried filter cake was sieved, the product was subjected to washing, filtering and drying to obtain a precursor.

(3) The precursor, lithium carbonate, and zirconium oxide were uniformly mixed according to the proportion of Li/(Ni+Co+Mn+Zr)=1.03 and Zr/(Ni+Co+Mn+Zr)=0.02, the mixture was sintered at 750° C. for 10 hours, and the product was crushed and sieved to obtain a cathode material substrate P3, which had an average particle diameter $D_{50}$ of 3.5 μm. The composition and particle size of the cathode material substrate were measured, and the results were shown in Table 1.

TABLE 1

| | Composition | $D_{50}$/μm |
|---|---|---|
| Preparation Example 1 | $Li_{1.02}Ni_{0.93}Co_{0.01}Mn_{0.05}Al_{0.01}O_2$ | 3.4 |
| Preparation Example 2 | $Li_{1.03}Ni_{0.9}Co_{0.03}Mn_{0.05}Zr_{0.02}O_2$ | 3.7 |
| Preparation Example 3 | $Li_{1.03}Ni_{0.9}Co_{0.05}Mn_{0.05}O_2$ | 3.5 |

Example 1

S1: a lithium source, a La source, an $N^1$ source, an $N^2$ source, an $N^3$ source, and an $N^4$ source were added into a high-speed blender, the materials were stirred at the rotational speed of 1,000 rpm for 3 h to obtain a first mixture, the first mixture was sintered at 800° C. in an air atmosphere for 8 h, then cooled to room temperature, subsequently crushed and sieved to obtain a coating agent $Li_{0.2}La_{0.48}Nd_{0.1}Sr_{0.05}Mn_{0.8}Ti_{0.2}O_3$, which had a particle diameter $D_{50}$ of 170 nm.

The coating agent $Li_{0.2}La_{0.48}Nd_{0.1}Sr_{0.05}Mn_{0.8}Ti_{0.2}O_3$ was prepared with a solid phase method, and the raw materials lithium hydroxide, lanthanum oxide, neodymium oxide, strontium oxide, trimanganese tetroxide, and titanium dioxide were weighed according to the stoichiometric ratio of elements in the chemical formula.

S2: the coating agent and the cathode material substrate P1 were added into the high-speed blender, and stirred at the rotational speed of 800 rpm for 6 hours, then sintered at 450° C. for 8 hours, after the sintered product was cooled to room temperature, it was crushed and sieved to obtain a surface-coated cathode material A1. Wherein the coating agent was used in an amount of 3 wt %, based on the total weight of the cathode material substrate P1.

The kinds and used amounts of the materials and the specific operating conditions of the preparation process were shown in Table 2.

Figure 2:
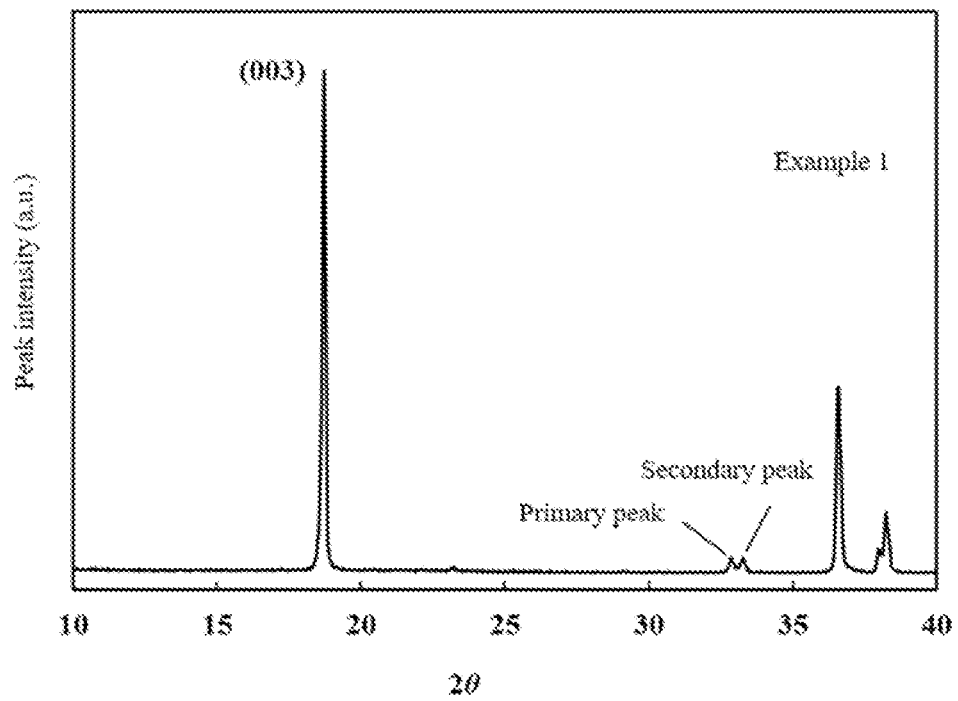
FIG. 2 illustrates an XRD phase diagram of the coated cathode material in Example 1.

The XRD spectrogram of the coating agent was shown in FIG. 1, as illustrated in FIG. 1, the characteristic peaks at 31°-35° of 2θ exhibited a bimodal distribution. The XRD spectrogram of the surface-coated cathode material A1 was shown in FIG. 2, as illustrated in FIG. 2, the doublet belonging to the coating agent still existed at 31°-35° of 2θ after the coating process.

According to XRD spectrograms of the coating agent and the surface-coated cathode material, the following parameters in the bimodal distribution of the characteristic peaks of the coating agent at 31°-35° of 2θ were calculated, namely a ratio $I_b/I_a$ of the peak intensity $I_b$ of the secondary peak to the peak intensity $I_a$ of the primary peak, a ratio $I_a/I_{(003)}$ of the peak intensity $I_a$ of the primary peak of the coating layer $Li_{0.2}La_{0.48}Nd_{0.1}Sr_{0.05}Mn_{0.8}Ti_{0.2}O_3$ at 31°-35° of 2θ and the peak intensity 1 (003) of the characteristic peak (003) corresponding to the (003) crystal plane of the cathode material substrate P1, a ratio of $A_a/A_{(003)}$ of the peak area $A_a$ of the primary peak of the coating layer $Li_{0.2}La_{0.48}Nd_{0.1}Sr_{0.05}Mn_{0.8}Ti_{0.2}O_3$ at 31°-35° of 2θ and the peak area $A_{(003)}$ of the characteristic peak (003) corresponding to the (003) crystal plane of the cathode material substrate P1, the results were shown in Table 3.

The particle size, ionic conductivity, electronic conductivity, and oxygen vacancy formation energy of the coating agent were measured, and the results were shown in Table 3. The XRD measurements were performed on the coating agent, the cathode material substrate, and the surface-coated cathode material, and the results were shown in Table 3.

Example 2

S1: a lithium source, a La source, an $N^1$ source, an $N^2$ source, and an $N^3$ source were added into a high-speed blender, the materials were stirred at the rotational speed of 1,200 rpm for 2 h to obtain a first mixture, the first mixture was sintered at 750° C. in an air atmosphere for 6 h, then cooled to room temperature, subsequently crushed and sieved to obtain a coating material $Li_{0.34}La_{0.47}Ce_{0.05}Mg_{0.05}MnO_3$, which had a particle diameter $D_{50}$ of 200 nm.

The coating material $Li_{0.34}La_{0.47}Ce_{0.05}Mg_{0.05}MnO_3$ was prepared with a solid phase method, and the raw materials lithium carbonate, lanthanum oxide, cerium oxide (an $N^1$ source), magnesium oxide (an $N^2$ source) and trimanganese tetroxide (an $N^3$ source) were weighed according to the stoichiometric ratio of elements in the chemical formula.

S2: the coating agent and the cathode material substrate P2 were added into the high-speed blender, and stirred at the rotating speed of 950 rpm for 4 hours, then sintered at 500° C. for 5 hours, after the sintered product was cooled to room temperature, it was crushed and sieved to obtain a surface-coated cathode material A2. Wherein the coating agent was used in an amount of 1.5 wt %, based on the total weight of the cathode material substrate P2.

The kinds and used amounts of the materials and the specific operating conditions of the preparation process were shown in Table 2.

According to XRD spectrograms of the coating agent and the surface-coated cathode material, the following parameters in the bimodal distribution of the characteristic peaks of the coating agent at 31°-35° of 2θ were calculated, namely a ratio $I_b/I_a$ of the peak intensity $I_b$ of the secondary peak to the peak intensity $I_a$ of the primary peak, a ratio $I_a/I_{(003)}$ of the peak intensity $I_a$ of the primary peak of the coating layer $Li_{0.34}La_{0.47}Ce_{0.05}Mg_{0.05}MnO_3$ at 31°-35° of 2θ and the peak intensity $I_{(003)}$ of the characteristic peak (003) corresponding to the (003) crystal plane of the cathode material substrate P2, a ratio of $A_a/A_{(003)}$ of the peak area $A_a$ of the primary peak of the coating layer $Li_{0.34}La_{0.47}Ce_{0.05}Mg_{0.05}MnO_3$ at 31°-35° of 2θ and the peak area $A_{(003)}$ of the characteristic peak (003) corresponding to the (003) crystal plane of the cathode material substrate P, the results were shown in Table 3.

The particle size, ionic conductivity, electronic conductivity, and oxygen vacancy formation energy of the coating agent were measured, and the results were shown in Table 3. The XRD measurements were performed on the coating agent, the cathode material substrate, and the surface-coated cathode material, and the results were shown in Table 3.

Example 3

S1: a lithium source, a La source, an $N^1$ source, an $N^3$ source, and an $N^4$ source were added into a high-speed blender, the materials were stirred at the rotational speed of 1,000 rpm for 3 h to obtain a first mixture, the first mixture was sintered at 800° C. in an air atmosphere for 8 h, then cooled to room temperature, subsequently crushed and sieved to obtain a coating agent $Li_{0.5}La_{0.4}Sm_{0.2}Ni_{0.7}Cr_{0.3}O_3$, which had a particle diameter $D_{50}$ of 110 nm.

The coating agent $Li_{0.5}La_{0.4}Sm_{0.2}Ni_{0.7}Cr_{0.3}O_3$ was prepared with a solid phase method, and the raw materials lithium carbonate, lanthanum oxide, samarium oxide (an $N^1$ source), nickel oxide (an $N^3$ source) and chromic oxide (an $N^4$ source) were weighed according to the stoichiometric ratio of elements in the chemical formula.

S2: the coating agent and the cathode material substrate P2 were added into the high-speed blender, and stirred at the rotating speed of 800 rpm for 4 hours, then sintered at 500° C. for 8 hours, after the sintered product was cooled to room temperature, it was crushed and sieved to obtain a surface-coated cathode material A3. Wherein the coating agent was used in an amount of 2.2 wt %, based on the total weight of the cathode material substrate P2.

The kinds and used amounts of the materials and the specific operating conditions of the preparation process were shown in Table 2.

According to XRD spectrograms of the coating agent and the surface-coated cathode material, the following parameters in the bimodal distribution of the characteristic peaks of the coating agent at 31°-35° of 2θ were calculated, namely a ratio $I_b/I_a$ of the peak intensity $I_b$ of the secondary peak to the peak intensity $I_a$ of the primary peak, a ratio $I_a/I_{(003)}$ of the peak intensity $I_a$ of the primary peak of the coating layer $Li_{0.5}La_{0.4}Sm_{0.2}Ni_{0.7}Cr_{0.3}O_3$ at 31°-35° of 2θ and the peak intensity $I_{(003)}$ of the characteristic peak (003) corresponding to the (003) crystal plane of the cathode material substrate P2, a ratio of $A_a/A_{(003)}$ of the peak area $A_a$ of the primary peak of the coating layer $Li_{0.5}La_{0.4}Sm_{0.2}Ni_{0.7}Cr_{0.3}O_3$ at 31°-35° of 2θ and the peak area $A_{(003)}$ of the characteristic peak (003) corresponding to the (003) crystal plane of the cathode material substrate P2, the results were shown in Table 3.

The particle size, ionic conductivity, electronic conductivity, and oxygen vacancy formation energy of the coating agent were measured, and the results were shown in Table 3. The XRD measurements were performed on the coating agent, the cathode material substrate, and the surface-coated cathode material, and the results were shown in Table 3.

Example 4

S1: a lithium source, a La source, an $N^1$ source, an $N^2$ source, an $N^3$ source, an $N^4$ source, and an ethanol solution were blended, citric acid was then added into the solution to form a mixed solution with a pH of 9.6, the mixed solution was stirred at 60° C. and 500 rpm for 5 h, and then transferred to an oven for drying at 120° C. for 8 h, the product was sintered at 800° C. in an air atmosphere for 8 h, then cooled to room temperature, subsequently crushed and sieved to obtain a coating agent $Li_{0.43}La_{0.48}Pr_{0.08}Ca_{0.1}Mn_{0.7}Fe_{0.3}O_3$, which had a particle diameter $D_{50}$ of 80 nm.

The coating agent $Li_{0.43}La_{0.48}Pr_{0.08}Ca_{0.1}Mn_{0.7}Fe_{0.3}O_3$ was prepared with a sol-gel method, and the raw materials lithium nitrate, lanthanum nitrate, praseodymium chloride (an $N^1$ source), calcium chloride (an $N^2$ source), manganese chloride (an $N^3$ source) and ferric chloride (an $N^4$ source) were weighed according to the stoichiometric ratio of elements in the chemical formula.

S2: the coating agent and the cathode material substrate P1 were added into the high-speed blender, and stirred at the rotating speed of 800 rpm for 6 hours, then sintered at 450° C. for 8 hours, after the sintered product was cooled to room temperature, it was crushed and sieved to obtain a surface-coated cathode material A4. Wherein the coating agent was used in an amount of 0.8 wt %, based on the total weight of the cathode material substrate P1.

The kinds and used amounts of the materials and the specific operating conditions of the preparation process were shown in Table 2.

According to XRD spectrograms of the coating agent and the surface-coated cathode material, the following parameters in the bimodal distribution of the characteristic peaks of the coating agent at 31°-35° of 2θ were calculated, namely a ratio $I_b/I_a$ of the peak intensity $I_b$ of the secondary peak to the peak intensity $I_a$ of the primary peak, a ratio $I_a/I_{(003)}$ of the peak intensity $I_a$ of the primary peak of the coating layer $Li_{0.43}La_{0.48}Pr_{0.08}Ca_{0.1}Mn_{0.7}Fe_{0.3}O_3$ at 31°-35° of 2θ and the peak intensity $I_{(003)}$ of the characteristic peak (003) corresponding to the (003) crystal plane of the cathode material substrate P1, a ratio of $A_a/A_{(003)}$ of the peak area $A_a$ of the primary peak of the coating layer $Li_{0.43}La_{0.48}Pr_{0.08}Ca_{0.1}Mn_{0.7}Fe_{0.3}O_3$ at 31°-35° of 2θ and the peak area $A_{(003)}$ of the characteristic peak (003) corresponding to the (003) crystal plane of the cathode material substrate P1, the results were shown in Table 3.

The particle size, ionic conductivity, electronic conductivity, and oxygen vacancy formation energy of the coating agent were measured, and the results were shown in Table 3. The XRD measurements were performed on the coating agent, the cathode material substrate, and the surface-coated cathode material, and the results were shown in Table 3.

Example 5

S1: a lithium source, a La source, an $N^1$ source, an $N^3$ source, and an $N^4$ source were added into a high-speed blender, the materials were stirred at the rotational speed of 1,000 rpm for 3 h to obtain a first mixture, the first mixture was sintered at 800° C. in an air atmosphere for 8 h, then cooled to room temperature, subsequently crushed and sieved to obtain a coating agent $Li_{0.5}La_{0.4}Sm_{0.2}Ni_{0.7}Cr_{0.3}O_3$, which had a particle diameter $D_{50}$ of 110 nm.

The coating agent $Li_{0.5}La_{0.4}Sm_{0.2}Ni_{0.7}Cr_{0.3}O_3$ was prepared with a solid phase method, and the raw materials lithium carbonate, lanthanum oxide, samarium oxide (an $N^1$ source), nickel oxide (an $N^3$ source) and chromic oxide (a $N^4$ source) were weighed according to the stoichiometric ratio of elements in the chemical formula.

S2: the coating agent and the cathode material substrate P2 were added into the high-speed blender, and stirred at the rotating speed of 800 rpm for 4 hours, then sintered at 500° C. for 8 hours, after the sintered product was cooled to room temperature, it was crushed and sieved to obtain a surface-coated cathode material A5. Wherein the coating agent was used in an amount of 0.2 wt %, based on the total weight of the cathode material substrate P2.

The kinds and used amounts of the materials and the specific operating conditions of the preparation process were shown in Table 2.

According to XRD spectrograms of the coating agent and the surface-coated cathode material, the following parameters in the bimodal distribution of the characteristic peaks of the coating agent at 31°-35° of 2θ were calculated, namely a ratio $I_b/I_a$ of the peak intensity $I_b$ of the secondary peak to the peak intensity $I_a$ of the primary peak, a ratio $I_a/I_{(003)}$ of the peak intensity $I_a$ of the primary peak of the coating layer $Li_{0.5}La_{0.4}Sm_{0.2}Ni_{0.7}Cr_{0.3}O_3$ at 31°-35° of 2θ and the peak intensity $I_{(003)}$ of the characteristic peak (003) corresponding to the (003) crystal plane of the cathode material substrate P2, a ratio of $A_a/A_{(003)}$ of the peak area $A_a$ of the primary peak of the coating layer $Li_{0.5}La_{0.4}Sm_{0.2}Ni_{0.7}Cr_{0.3}O_3$ at 31°-35° of 2θ and the peak area $A_{(003)}$ of the characteristic peak (003) corresponding to the (003) crystal plane of the cathode material substrate P2, the results were shown in Table 3.

The particle size, ionic conductivity, electronic conductivity, and oxygen vacancy formation energy of the coating agent were measured, and the results were shown in Table 3. The XRD measurements were performed on the coating agent, the cathode material substrate, and the surface-coated cathode material, and the results were shown in Table 3.

Example 6

S1: a lithium source, a La source, an $N^1$ source, an $N^2$ source, an $N^3$ source, and an $N^4$ source were added into a high-speed blender, the materials were stirred at the rotational speed of 1,000 rpm for 3 h to obtain a first mixture, the first mixture was sintered at 900° C. in an air atmosphere for 8 h, then cooled to room temperature, subsequently crushed and sieved to obtain a coating agent $Li_{0.2}La_{0.48}Nd_{0.1}Sr_{0.05}Mn_{0.8}Ti_{0.2}O_3$, which had a particle diameter $D_{50}$ of 220 nm.

The coating agent $Li_{0.2}La_{0.48}Nd_{0.1}Sr_{0.05}Mn_{0.8}Ti_{0.2}O_3$ was prepared with a solid phase method, and the raw materials lithium hydroxide, lanthanum oxide, neodymium oxide (an $N^1$ source), strontium oxide (an $N^2$ source), trimanganese tetroxide (an $N^3$ source) and titanium dioxide (an $N^4$ source) were weighed according to the stoichiometric ratio of elements in the chemical formula.

S2: the coating agent and the cathode material substrate P3 were added into the high-speed blender, and stirred at the rotating speed of 800 rpm for 6 hours, then sintered at 300° C. for 8 hours, after the sintered product was cooled to room temperature, it was crushed and sieved to obtain a surface-coated cathode material A6. Wherein the coating agent was used in an amount of 8 wt %, based on the total weight of the cathode material substrate P3.

The kinds and used amounts of the materials and the specific operating conditions of the preparation process were shown in Table 2.

According to XRD spectrograms of the coating agent and the surface-coated cathode material, the following parameters in the bimodal distribution of the characteristic peaks of the coating agent at 31°-35° of 2θ were calculated, namely a ratio $I_b/I_a$ of the peak intensity $I_b$ of the secondary peak to the peak intensity $I_a$ of the primary peak, a ratio $I_a/I_{(003)}$ of the peak intensity $I_a$ of the primary peak of the coating layer $Li_{0.2}La_{0.48}Nd_{0.1}Sr_{0.05}Mn_{0.8}Ti_{0.2}O_3$ at 31°-35° of 2θ and the peak intensity $I_{(003)}$ of the characteristic peak (003) corresponding to the (003) crystal plane of the cathode material substrate P3, a ratio of $A_a/A_{(003)}$ of the peak area $A_a$ of the primary peak of the coating layer $Li_{0.2}La_{0.48}Nd_{0.1}Sr_{0.05}Mn_{0.8}Ti_{0.2}O_3$ at 31°-35° of 2θ and the peak area $A_{(003)}$ of the characteristic peak (003) corresponding to the (003) crystal plane of the cathode material substrate P3, the results were shown in Table 3.

The particle size, ionic conductivity, electronic conductivity, and oxygen vacancy formation energy of the coating agent were measured, and the results were shown in Table 3.

The XRD measurements were performed on the coating agent, the cathode material substrate, and the surface-coated cathode material, and the results were shown in Table 3.

Comparative Example 1

The cathode material substrate P1 obtained in Preparation Example 1 was used as a cathode material D1. The XRD test was performed on the cathode material D1, and the results were shown in Table 3.

Comparative Example 2

The cathode material substrate P2 obtained in Preparation Example 2 was used as a cathode material D2. The XRD test was performed on the cathode material D2, and the results were shown in Table 3.

Comparative Example 3

The cathode material substrate P3 obtained in Preparation Example 3 was used as a cathode material D3. The XRD test was performed on the cathode material D3, and the results were shown in Table 3.

TABLE 2

|  | A1 | A2 | A3 | A4 | A5 | A6 |
|---|---|---|---|---|---|---|
| S1 | | | | | | |
| Lithium source | Lithium hydroxide | Lithium carbonate | Lithium carbonate | Lithium nitrate | Lithium carbonate | Lithium hydroxide |
| La source | Lanthanum oxide | Lanthanum oxide | Lanthanum oxide | Lanthanum nitrate | Lanthanum oxide | Lanthanum oxide |
| $N^1$ source | Neodymium oxide | Cerium oxide | Samarium oxide | Praseodymium chloride | Samarium oxide | Neodymium oxide |
| $N^2$ source | Strontium oxide | Magnesium oxide | / | Calcium chloride | / | Strontium oxide |
| $N^3$ source | Trimanganese tetroxide | Trimanganese tetroxide | Nickel oxide | Manganese chloride | Nickel oxide | Trimanganese tetroxide |
| $N^4$ source | Titanium dioxide | / | Chromium oxide | Ferric chloride | Chromium oxide | Titanium dioxide |
| $n(Li):n(La):n(N^1):n(N^2):n(N^3):n(N^4)$ | 0.2:0.48:0.1:0.05:0.8:0.2 | 0.34:0.47:0.05:0.05:1:0 | 0.5:0.4:0.2:0:0.7:0.3 | 0.43:0.48:0.08:0.1:0.7:0.3 | 0.5:0.4:0.2:0:0.7:0.3 | 0.2:0.48:0.1:0.05:0.8:0.2 |
| Mixing rotational speed/rpm | 1000 | 1200 | 1000 | 500 | 1000 | 1000 |
| Mixing time/h | 3 | 2 | 3 | 5 | 3 | 3 |
| Mixing temperature/° C. | / | / | / | 60 | / | / |
| pH | / | / | / | 9.6 | / | / |
| Drying time/h | / | / | / | 120 | / | / |
| Drying temperature/° C. | / | / | / | 8 | / | / |
| First sintering temperature/° C. | 800 | 750 | 1000 | 800 | 1000 | 900 |
| First sintering time/h | 8 | 6 | 8 | 8 | 8 | 8 |
| S2 | | | | | | |
| Cathode material substrate | P1 | P2 | P2 | P1 | P2 | P3 |
| Used amount of coating agent/wt % | 3 | 1.5 | 2.2 | 0.8 | 0.2 | 8 |
| Second mixing rotational speed/rpm | 800 | 950 | 800 | 800 | 800 | 800 |
| Second mixing time/h | 6 | 4 | 4 | 6 | 4 | 6 |
| Second sintering temperature/° C. | 450 | 500 | 500 | 450 | 500 | 300 |
| Second sintering time/h | 8 | 5 | 8 | 8 | 8 | 8 |

TABLE 3

| Results | Particle diameter nm | $I_a/I_b$ | Ionic conductivity S/cm | Electronic conductivity S/cm | Oxygen vacancy formation energy eV |
|---|---|---|---|---|---|
| A1 | 170 | 0.97 | $1.8 \times 10^{-4}$ | $2.9 \times 10^{-5}$ | 0.68 |
| A2 | 200 | 0.98 | $2 \times 10^{-5}$ | $3.5 \times 10^{-4}$ | −1.07 |
| A3 | 110 | 0.96 | $5.6 \times 10^{-5}$ | $3.3 \times 10^{-5}$ | 0.43 |
| A4 | 80 | 0.98 | $3.7 \times 10^{-5}$ | $4.7 \times 10^{-4}$ | 0.95 |
| A5 | 110 | 0.96 | $5.6 \times 10^{-5}$ | $3.3 \times 10^{-5}$ | 0.43 |
| A6 | 220 | 1.10 | $0.6 \times 10^{-5}$ | $0.3 \times 10^{-6}$ | 4.70 |

| Results | Coating layer Composition | Substrate | $I_d/I_{(003)}$ % | $A_d/A_{(003)}$ % |
|---|---|---|---|---|
| A1 | $Li_{0.2}La_{0.48}Nd_{0.1}Sr_{0.05}Mn_{0.8}Ti_{0.2}O_3$ | P1 | 2.1 | 4.3 |
| A2 | $Li_{0.34}La_{0.47}Ce_{0.05}Mg_{0.05}MnO_3$ | P2 | 1.6 | 2.1 |
| A3 | $Li_{0.5}La_{0.4}Sm_{0.2}Ni_{0.7}Cr_{0.3}O_3$ | P2 | 1.9 | 3.2 |
| A4 | $Li_{0.43}La_{0.48}Pr_{0.08}Ca_{0.1}Mn_{0.7}Fe_{0.3}O_3$ | P1 | 0.8 | 1.6 |
| A5 | $Li_{0.5}La_{0.4}Sm_{0.2}Ni_{0.7}Cr_{0.3}O_3$ | P2 | 1 | 2.6 |
| A6 | $Li_{0.2}La_{0.48}Nd_{0.1}Sr_{0.05}Mn_{0.8}Ti_{0.2}O_3$ | P3 | 3.6 | 6.3 |
| D1 | / | P1 | / | / |
| D2 | / | P2 | / | / |
| D3 | / | P3 | / | / |

Test Example

The cathode materials in Examples and Comparative Examples were assembled into lithium-ion batteries, the thermal stabilities of the cathode materials in the delithiation state were tested respectively, and the results were shown in Table 4. The properties of the lithium-ion batteries were tested, and the results were shown in Table 5.

TABLE 4

| Results | T1 °C. | T1-T0 °C. |
|---|---|---|
| A1 | 210 | 7 |
| A2 | 218 | 13 |
| A3 | 213 | 8 |
| A4 | 207 | 4 |
| A5 | 206 | 2 |
| A6 | 201 | 1 |
| D1 | 203 | 0 |
| D2 | 205 | 0 |
| D3 | 200 | 0 |

TABLE 5

| Unit | Discharge capacity at 0.1C multiplying power mAh/g | Discharge capacity at 0.2C multiplying power mAh/g | Discharge capacity at 0.5C multiplying power mAh/g | Discharge capacity at 1C multiplying power mAh/g | Capacity retention rate after 80 cycles at 1C multiplying power % |
|---|---|---|---|---|---|
| Example 1 | 221.6 | 217 | 209.6 | 206.5 | 94.7 |
| Example 2 | 220.4 | 213.9 | 205.5 | 199 | 94.2 |
| Example 3 | 218.7 | 211.8 | 202.6 | 197.1 | 78.1 |
| Example 4 | 219.4 | 214.8 | 207.7 | 202.2 | 94.0 |
| Example 5 | 212.0 | 210.2 | 204.2 | 202.0 | 68.0 |
| Example 6 | 210.0 | 208.4 | 203.4 | 201.3 | 61.7 |
| Comparative Example 1 | 216.9 | 210.8 | 204.2 | 197.6 | 87.5 |
| Comparative Example 2 | 211.9 | 204.5 | 195.2 | 189.3 | 66.8 |
| Comparative Example 3 | 209.4 | 207.6 | 203.2 | 200.1 | 60.2 |

As can be seen with reference to Table 4 and Table 5, the temperature corresponding to the DSC peak after complete delithiation of the cathode materials obtained in Examples 1-6 is higher than that of Comparative Examples 1-3, indicating that the cathode materials of Examples 1-6 have more excellent thermal stability. In addition, both the rate performance and cycling performance of the lithium-ion batteries assembled with the cathode materials of Examples 1-6 are improved.

Figure 5:
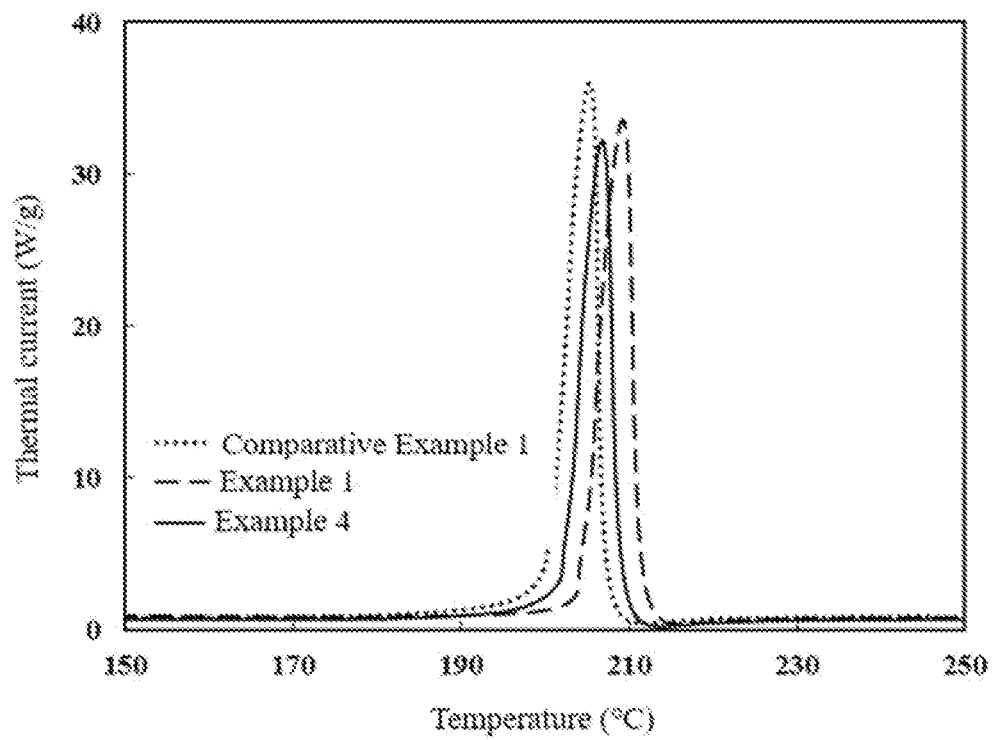
FIG. 5 is a graph showing the DSC curves of Comparative Example 1, Example 1, and Example 4.

As shown in FIG. 5, the temperature corresponding to the DSC peak for the cathode material in a complete delithiation state in Example 1 is 210° C., the temperature corresponding to the DSC peak for the cathode material in a complete delithiation state in Example 4 is 207° C., the temperature corresponding to the DSC peak for the cathode material in a complete delithiation state in Comparative Example 1 is 203° C., it demonstrates that the cathode materials of Examples 1 and 4 have more excellent thermal stability than the cathode material of Comparative Example 1.

Figure 3:
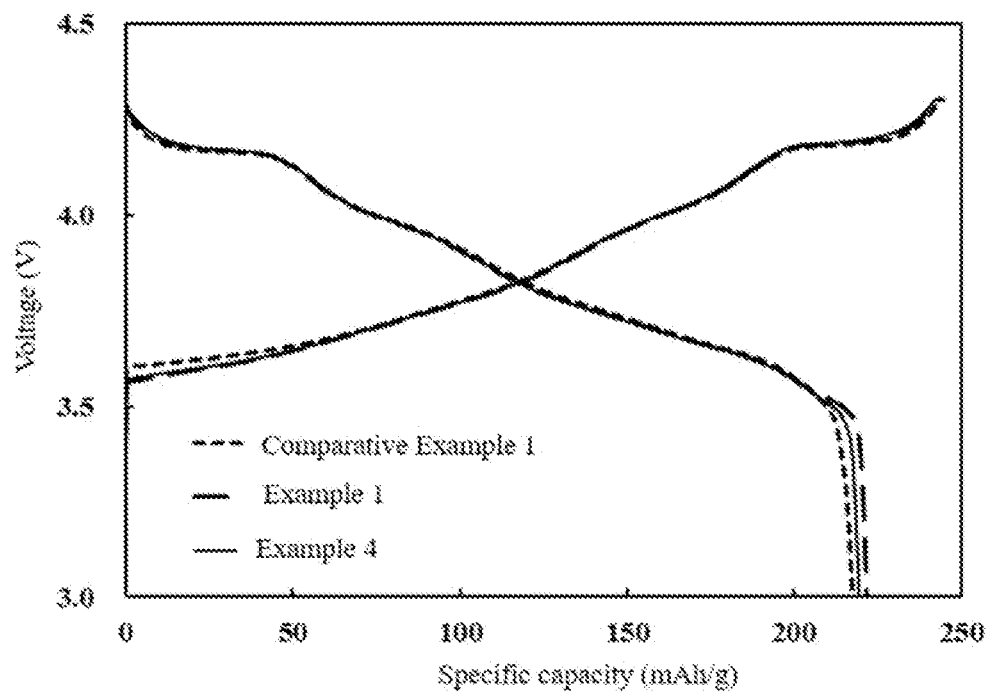
FIG. 3 is a graph showing the charging and discharging curves of the half cells prepared in Comparative Example 1, Example 1, and Example 4 at 0.1C.

As shown in FIG. 3, compared with the battery in Comparative Example 1, the batteries in Examples 1 and 4 have slightly improved discharge capacity at different multiplying powers, indicating that the coated cathode material exhibits an improved rate performance, and the thermal stability of the materials is improved by moving backward the DSC peak position.

Figure 6:
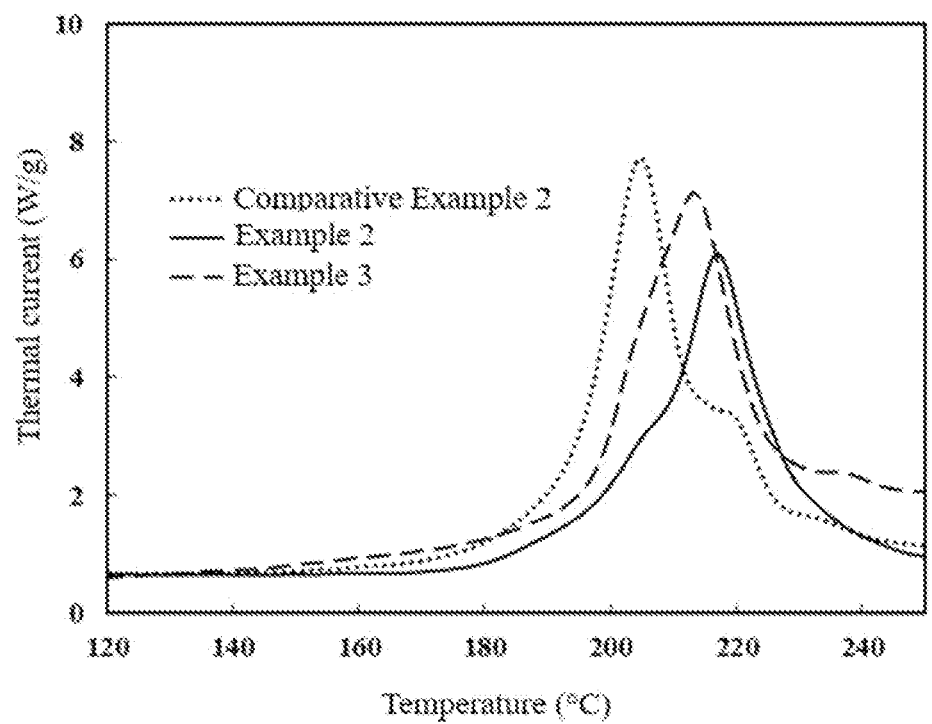
FIG. 6 is a graph showing the DSC curves of Comparative Example 2, Example 2, and Example 3.

As shown in FIG. 6, the temperature corresponding to the DSC peak for the cathode material in a complete delithiation state in Example 2 is 218° C., the temperature corresponding to the DSC peak for the cathode material in a complete delithiation state in Example 3 is 213° C., the temperature corresponding to the DSC peak for the cathode material in a complete delithiation state in Comparative Example 2 is 205° C., it demonstrates that the cathode materials of Examples 2 and 3 exhibit more excellent thermal stability than the cathode material of Comparative Example 2.

Figure 4:
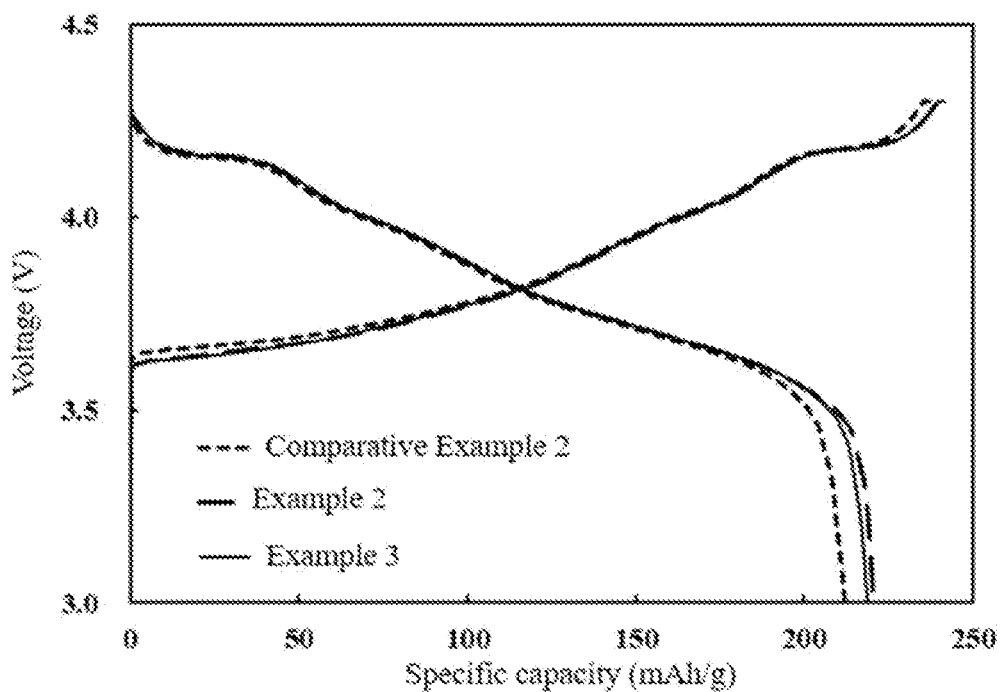
FIG. 4 is a graph showing the charging and discharging curves of the half cells prepared in Comparative Example 2, Example 2, and Example 3 at 0.1C.

As shown in FIG. 4, the cathode materials in Examples 2 and 3 have an improved capacity retention rate after 80 charging and discharging cycles than the Comparative Example 2, indicating that coated cathode materials have reduced side reactions between the cathode material and the electrolyte. The temperature corresponding to the DSC peak for the cathode materials is raised, demonstrating an improved thermal stability of the materials per se.

The invention claimed is:

1. A surface-coated cathode material, wherein the cathode material comprises a substrate and a coating layer coated on a surface of the substrate;

the coating layer has a bimodal distribution of characteristic peaks at 31°-35° of 2θ tested by X-Ray Diffraction (XRD); and a ratio $I_b/I_a$ of a peak intensity $I_b$ of a secondary peak to a peak intensity $I_a$ of a primary peak in a bimodal distribution is within a range of 0.8-1.

2. The surface-coated reactive electrode material of claim 1, wherein the substrate has a peak intensity $I_{(003)}$ of a characteristic peak (003) corresponding to a (003) crystal plane tested by XRD, $0.01 \leq I_a/I_{(003)} \times 100\% \leq 3.5\%$;

and/or, the substrate has a peak area $A_{(003)}$ of the characteristic peak (003) corresponding to the (003) crystal plane tested by XRD, the coating layer has a peak area $A_a$ of the primary peak in the bimodal distribution of characteristic peaks at 31°-35° of 2θ tested by XRD, $0.01\% \leq A_a/A_{(003)} \times 100\% \leq 6\%$.

3. The surface-coated reactive electrode material of claim 1, wherein the substrate has a peak intensity $I_{(003)}$ of the characteristic peak (003) corresponding to the (003) crystal plane tested by XRD, $0.08\% \leq I_a/I_{(003)} \times 100\% \leq 3.1\%$;

and/or, the substrate has a peak area $A_{(003)}$ of the characteristic peak (003) corresponding to the (003) crystal plane tested by XRD, the coating layer has a peak area $A_a$ of the primary peak in the bimodal distribution of characteristic peaks at 31°-35° of 2θ tested by XRD, $0.5\% \leq A_a/A_{(003)} \times 100\% \leq 4.8\%$.

4. The surface-coated cathode material of claim 1, wherein the substrate has a composition represented by formula I:

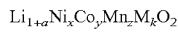

$$Li_{1+a}Ni_xCo_yMn_zM_kO_2 \quad \text{formula I;}$$

wherein $-0.05 \leq a \leq 0.5$, $0 \leq x \leq 1$, $0 \leq y \leq 1$, $0 \leq z \leq 1$, $0 \leq k \leq 0.06$, $0 < x+y+z+k \leq 1$, and M is at least one element selected from Ga, Sc, In, Y, Ce, Co, La, Cr, Mo, Mn, Fe, Hf, Zr, W, Nb, Sm, and Al;

the coating layer has a composition represented by formula II:

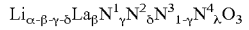

$$Li_{\alpha-\beta-\gamma-\delta}La_\beta N^1_\gamma N^2_\delta N^3_{1-\gamma}N^4_\lambda O_3 \quad \text{formula II;}$$

wherein $0.7 < \alpha < 1.5$, $0.2 < \beta < 1$, $0 \leq \gamma < 0.5$, $0 \leq \delta < 0.5$, $0 \leq \lambda < 0.5$; $N^1$ is an element selected from Y, Nd, Pr, Ce, Sin, Sc, and a combination thereof, $N^2$ is an element selected from Sr, Ca, Mg, Si, Ge, Ru, and a combination thereof, $N^3$ is an element selected from Ni, Mn, Co, and a combination thereof, and $N^4$ is an element selected from Cr, Al, V, Nb, Zr, Ti, Fe, and a combination thereof.

5. The surface-coated cathode material of claim 4, wherein M in formula I is at least one element selected from Ce, Co, La, Cr, Mo, Y, Zr, W, Nb, and Al;

and/or, in formula II, $0.9 < \alpha < 1.3$, $0.35 < \beta < 0.7$, $0.04 \leq \gamma < 0.4$, $0 < \delta < 0.3$, $0 \leq \lambda < 0.46$;

and/or, $N^1$ in formula II is at least one element selected from Nd, Pr, Ce, Sm, and Sc;

and/or, $N^2$ in formula II is at least one element selected from Sr, Ca, Mg, Si, and Ru;

and/or, $N^3$ in formula II is selected from Ni and/or Mn;

and/or, $N^4$ in formula II is at least one element selected from Cr, Al, Nb, Zr, Ti, and Fe.

6. The surface-coated cathode material of claim 4, wherein the content of the coating layer is within a range of 0.05-4 wt %, based on the total weight of the substrate.

7. The surface-coated cathode material of claim 1, wherein an average particle diameter $D_{50}$ of the surface-coated cathode material is within a range of 2-17 μm;

and/or, an electronic conductivity of the coating layer is within a range of $1 \times 10^{-5}$ S/cm-$8 \times 10^{-3}$ S/cm;

and/or, the ionic conductivity of the coating layer is within a range of $1 \times 10^{-6}$ S/cm-$6 \times 10^{-4}$ S/cm;

and/or, an oxygen vacancy formation energy of the coating layer is from −2 eV to 4.5 eV.

8. The surface-coated cathode material of claim 1, wherein the temperature corresponding to an exothermic peak of the surface-coated cathode material tested by DSC is T1, the temperature corresponding to an exothermic peak of the substrate tested by DSC is T0, T1-T0 is within a range of 3-15° C.

9. The surface-coated cathode material of claim 1, wherein the ratio $I_b/I_a$ of the peak intensity $I_b$ of the secondary peak to the peak intensity $I_a$ of the primary peak in the bimodal distribution is within a range of 0.97-1.

10. A lithium-ion battery comprising the surface-coated cathode material of claim 1.

11. A method for preparing a surface-coated cathode material according to claim 1 comprising the following steps:

S1: subjecting a lithium source, a La source, an optional $N^1$ source, an optional $N^2$ source, an $N^3$ source, and an optional $N^4$ source to a first mixing to obtain a first mixture, performing a first sintering on the first mixture, and crushing it to obtain a coating agent;

S2: subjecting the coating agent and a cathode material substrate to a second mixing to obtain a second mixture, performing a second sintering on the second mixture to prepare the surface-coated cathode material.

12. The method of claim 11, wherein the lithium source, the La source, the $N^1$ source, the $N^2$ source, the $N^3$ source, and the $N^4$ source are used in amounts such that $n(Li):n(La):n(N^1):n(N^2):n(N^3):n(N^4)$ is $(\alpha-\beta-\gamma-\delta):\beta:\gamma:\delta:(1-\lambda):\lambda$, wherein $0.7 < \alpha < 1.5$, $0.2 < \beta < 1$, $0 \leq \gamma < 0.5$, $0 \leq \delta < 0.5$, $0 \leq \lambda < 0.5$;

and/or, the coating agent is used in an amount of 0.05-4 wt %, based on the total weight of the cathode material substrate.

13. The method of claim 11, wherein the $N^1$ source is a compound containing at least one element selected from Y, Nd, Pr, Ce, Sm, and Sc;

and/or, the $N^2$ source is a compound containing at least one element selected from Sr, Ca, Mg, Si, Ge, and Ru;

and/or, the $N^3$ source is a compound containing at least one element selected from Ni, Mn, and Co;

and/or, the $N^4$ source is a compound containing at least one element selected from Cr, Al, V, Nb, Zr, Ti, and Fe;

and/or, the conditions of the first sintering comprise a sintering temperature within a range of 500-1,120° C. and a sintering time within a range of 3-9 h;

and/or, the average particle diameter $D_{50}$ of the coating agent is within a range of 30-200 nm;

and/or, the conditions of the second sintering comprise a sintering temperature within a range of 300-900° C. and a sintering time within a range of 1-12 h.

14. The method of claim 11, wherein the step S1 comprising:

(a) subjecting a lithium source, a La source, an optional $N^1$ source, an optional $N^2$ source, an $N^3$ source, and an optional $N^4$ source to a fourth mixing to obtain a fourth mixture, performing fourth sintering on the fourth mixture, and crushing it to obtain a coating agent; or (b) subjecting a lithium source, a La source, an optional $N^1$ source, an optional $N^2$ source, a $N^3$ source, an optional $N^4$ source, and a solvent to a fifth mixing to obtain a fifth mixture, adjusting the pH of the fifth mixture, drying and performing a fifth sintering, and crushing it to obtain a coating agent.

15. The method of claim 14, wherein the conditions of the fourth sintering comprise a sintering temperature within a range of 600-1,000° C. and a sintering time within a range of 3-9 h;

and/or, the conditions of the fifth sintering comprise a sintering temperature within a range of 500-850° C. and a sintering time within a range of 4-8 h.

16. The method of claim 11, wherein the cathode material substrate is prepared according to the following steps:
(1) preparing a mixed salt solution with a nickel salt, a cobalt salt, and a manganese salt according to the molar ratio of n(Ni):n(Co):n(Mn) being x:y:z; preparing a precipitant solution and a complexing agent solution with a precipitant and a complexing agent respectively;
(2) adding the mixed salt solution, the precipitant solution, and the complexing agent solution into a reaction kettle, and performing a coprecipitation reaction to obtain a precursor slurry, wherein the precursor slurry is subjected to solid-liquid separation, washing, drying, and sieving to obtain a nickel-cobalt-manganese hydroxide precursor;
(3) blending the nickel-cobalt-manganese hydroxide precursor, a lithium source, and an optional compound containing an M element to obtain a sixth mixture, carrying out a sixth sintering on the sixth mixture in an oxygen-containing atmosphere, and crushing and sieving it to prepare the cathode material substrate;
and/or, $0 \leq x \leq 1$, $0 \leq y \leq 1$, $0 \leq z \leq 1$;
and/or, the nickel-cobalt-manganese hydroxide precursor, the lithium source, and the compound containing an M element are used in amounts such that n(Li)/[n(Ni)+n(Co)+n(Mn)+n(M)] is within a range of 0.95-1.5;
n(M)/[n(Ni)+n(Co)+n(Mn)+n(M)] is within a range of 0-0.06;
and/or, the compound containing an M element is selected from compounds containing at least one element of Ga, Sc, In, Y, Ce, Co, La, Cr, Mo, Mn, Fe, Hf, Zr, W, Nb, Sm, and Al;
and/or, the conditions of the coprecipitation reaction comprise a reaction temperature within a range of 40-120° C. and a pH within a range of 9-12;
and/or, the conditions of the sixth sintering comprise a sintering temperature within a range of 500-1,000° C. and a sintering time within a range of 3-18 h.

17. A method for preparing a surface-coated cathode material according to claim 1 comprising the following steps:
subjecting a lithium source, a La source, an optional $N^1$ source, an optional $N^2$ source, an $N^3$ source, an optional $N^4$ source, and a cathode material substrate to a third mixing to obtain a third mixture, performing a third sintering on the third mixture to prepare the surface-coated cathode material.

18. The method of claim 17, wherein the lithium source, the La source, the $N^1$ source, the $N^2$ source, the $N^3$ source, and the $N^4$ source are used in amounts such that n(Li):n(La):n($N^1$):n($N^2$):n($N^3$):n($N^4$) is $(\alpha-\beta-\gamma-\delta):\beta:\gamma:\delta:(1-\lambda):\lambda$, wherein $0.7<\alpha<1.5$, $0.2<\beta<1$, $0\leq\gamma<0.5$, $0\leq\delta<0.5$, $0\leq\lambda<0.5$;

and/or, the total amount of the lithium source, the La source, the $N^1$ source, the $N^2$ source, the $N^3$ source, and the $N^4$ source causes the content of a product of the lithium source, the La source, the $N^1$ source, the $N^2$ source, the $N^3$ source, and the $N^4$ source obtained after the third sintering is within a range of 0.05-4 wt %, based on the total weight of the cathode material substrate.

19. The method of claim 17, wherein the conditions of the third sintering comprise a sintering temperature within a range of 300-900° C. and a sintering time within a range of 1-12 h.

20. The method of claim 17, wherein the cathode material substrate is prepared according to the following steps:
(1) preparing a mixed salt solution with a nickel salt, a cobalt salt, and a manganese salt according to the molar ratio of n(Ni):n(Co):n(Mn) being x:y:z; preparing a precipitant solution and a complexing agent solution with a precipitant and a complexing agent respectively;
(2) adding the mixed salt solution, the precipitant solution, and the complexing agent solution into a reaction kettle, and performing a coprecipitation reaction to obtain a precursor slurry, wherein the precursor slurry is subjected to solid-liquid separation, washing, drying, and sieving to obtain a nickel-cobalt-manganese hydroxide precursor;
(3) blending the nickel-cobalt-manganese hydroxide precursor, a lithium source, and an optional compound containing an M element to obtain a sixth mixture, carrying out a sixth sintering on the sixth mixture in an oxygen-containing atmosphere, and crushing and sieving it to prepare the cathode material substrate;
and/or, $0 \leq x \leq 1$, $0 \leq y \leq 1$, $0 \leq z \leq 1$;
and/or, the nickel-cobalt-manganese hydroxide precursor, the lithium source, and the compound containing an M element are used in amounts such that n(Li)/[n(Ni)+n(Co)+n(Mn)+n(M)] is within a range of 0.95-1.5;
n(M)/[n(Ni)+n(Co)+n(Mn)+n(M)] is within a range of 0-0.06;
and/or, the compound containing an M element is selected from compounds containing at least one element of Ga, Sc, In, Y, Ce, Co, La, Cr, Mo, Mn, Fe, Hf, Zr, W, Nb, Sm, and Al;
and/or, the conditions of the coprecipitation reaction comprise a reaction temperature within a range of 40-120° C. and a pH within a range of 9-12;
and/or, the conditions of the sixth sintering comprise a sintering temperature within a range of 500-1,000° C. and a sintering time within a range of 3-18 h.

\* \* \* \* \*